United States Patent Office 3,211,579
Patented Oct. 12, 1965

3,211,579
THERMOSETTING RESINOUS COMPOSITIONS
Ralph H. Reiter, Wallingford, Conn., assignor to American Cyanamid Company, New York, N.Y., a corporation of Maine
No Drawing. Filed Aug. 16, 1961, Ser. No. 131,745
15 Claims. (Cl. 117—138.8)

This invention relates to a novel method of imparting resistance to stains, particularly those made by coffee and tea, to heat- and pressure-consolidated articles prepared from aminoplast resinous compositions. This invention also relates to the novel stain-resistant articles themselves, such as molded tableware articles, produced according to my novel method, and further relates to the novel stain-retarding compositions used in preparing such articles.

The many excellent properties possessed by aminoplast resins, and in particular by aminotriazine-aldehyde resins such as melamine-formaldehyde resins, have led to their widespread use in the molding and laminating fields. More particularly, these thermosetting or heat-hardenable resins possess, in the cured or thermoset state, superior break-resistance, resistance to water and other solvents, to softening or other internal heat-failure, to cracking when exposed to electrical stress, and to surface failures such as loss of gloss, discoloration or crazing due to heat and light, all of which features render them especially suitable for the preparation of heat- and pressure-consolidated molded and laminated articles.

However, heat- and pressure-consolidated articles such as laminated table, counter and bar tops, molded cups, saucers, plates, and the like, prepared from conventional thermosetting aminoplast resins such as melamine-formaldehyde resinous condensates do possess one deficiency which detracts from their overall excellence. Articles of this type are susceptible to various kinds of stains. Coffee and tea are among the worst offenders in this respect, but other substances, for example, the juices of various fruits and vegetables, such as raspberry, grape, and beet juices, to mention just a few, soft drinks (e.g., cola drinks), cocoa, and the like, also leave stains which detract from the appearance, although not the durability, of such molded and laminated articles, and which are difficult to remove even if attended to immediately.

This propensity of conventionally prepared heat- and pressure-consolidated aminoplast laminated and molded articles for staining has limited, in many cases, the extent to which such articles have found acceptance in many important areas of everyday use, in that many people, and especially restaurateurs and other large-volume users of dinnerware, have been reluctant to replace chinaware with high-quality tableware made from thermosetting melamine-formaldehyde resinous compositions, despite the latter's many obviously superior properties.

I have now discovered novel thermosetting resinous compositions which, when applied to the surfaces of heat- and pressure-consolidated cured or partially cured articles prepared from conventional thermosetting aminoplast resinous compositions, such as melamine-formaldehyde resinous compositions, and cured thereon, impart substantial stain-resistance to said articles. More particularly, the present invention provides novel thermosetting resinous compositions comprising (A) a reactive condensate obtained by co-reacting (1) a polyalkylated polymethylolmelamine, such as hexakismethoxymethylmelamine, with (2) an organic polycarboxylic acid, such as phthalic acid, blended with (B) a reactive organic polyfunctional polyol, such as an epoxy resinous material prepared by reacting a polyhydric phenol with an epihalohydrin, which are capable of being cured, in the presence of an acid catalyst, to a substantially insoluble, infusible, stain-resistant form.

It is, therefore, an object of my invention to provide novel thermosetting resinous compositions.

It is also an object of my invention to provide novel stain-retarding compositions of matter which, when cured, impart substantial stain-resistance to heat- and pressure-consolidated articles prepared from conventional thermosetting aminoplast resinous composition, particularly those prepared from melamine-formaldehyde resinous compositions.

A further object of my invention is to provide novel heat- and pressure-consolidated articles prepared from conventional thermosetting aminoplast resinous compositions, and particularly from melamine-formaldehyde resinous compositions, which are substantially resistant to staining by common foods and beverages.

An additional object of my invention is to provide novel methods of imparting substantial stain-resistance to heat- and pressure-consolidated articles prepared from conventional thermosetting aminoplast resinous compositions, particularly those prepared from melamine-formaldehyde resinous compositions.

These and other objects of my invention will be discussed more fully hereinbelow.

The novel thermosetting resinous compositions of the present invention, which may also be designated as potentially stain-retarding compositions, are, as indicated above, blends of two essential ingredients. The first of these is a reactive condensate (A) obtained by co-reacting a polyalkylated polymethylolmelamine with an organic polycarboxylic acid.

Polyalkylated polymethylolmelamines are prepared by methods which are so well known in the art that it is not necessary that they be set forth in great detail herein. In general, the conventional methods of preparing polyalkylated polymethylolmelamines involve the basic steps of reacting melamine with aqueous formaldehyde in mol ratios ranging from about 6.5 to about 20 mols or more of formaldehyde per mol of melamine to form polymethylolmelamine; removing the bulk of the water from the thus-formed polymethylolmelamines, and there-after reacting the polymethylolmelamines under strongly acidic conditions with from about 10 to about 30 mols of a lower alkanol, such as methanol, per mol of melamine. Various modifications and improvements of this basic process have been developed, such as those set forth in U.S. Patents Nos. 2,715,619 to Suen et al. and 2,918,452 to Kun et al.

The polyalkylated polymethylolmelamines employed in preparing the reactive condensate (A) are those represented by the general formula:

$$MF_xA_y$$

wherein M represents the melamine starting material, $F_x$ represents the degree to which the melamine starting material has been methylolated and $A_y$ represents the degree to which the methylol groups of the polymethylolmelamine intermediate have been alkylated with a lower alkyl group such as methyl, ethyl, propyl, and the like, $x$ being a number between about 4 and 6, inclusive, and $y$ being a number between about 3 and 6, inclusive, such that there is no more than about one unalkylated methylol group present in the polyalkylated polymethylolmelamine. Thus, the polyalkylated polymethylolmelamines employed in the practice of the present invention range from the hexa-alkyl ethers of hexamethylolmelamine, such as hexakismethoxymethylmelamine and the like, which represent the highest degree of methylolation and alkylation obtainable, to the trialkyl ethers of tetramethylolmelamine, such as the trimethyl ether of tetramethylolmelamine and the like. As is evident from the general formula and the values of $x$ and $y$ given above, mixtures of these polyalkylated polymethylolmelamines may also be employed.

Any of a wide variety of organic polycarboxylic acids may be co-reacted with the polyalkylated polymethylolmelamine. I prefer to employ dicarboxylic acids which are either saturated or which contain only benzenoid unsaturation, among which there are included such acids as oxalic, malonic, succinic, glutaric, adipic, pimelic, suberic, azelaic, sebacic, malic, tartaric, citric, phthalic isophthalic, terephthalic, cyclohexanedicarboxylic, endomethylenetetrahydrophthalic, and the like, as well as mixtures thereof, but I may also employ dicarboxylic acids containing non-benzenoid unsaturation either alone or together with the aforementioned acids. Among this latter type of dicarboxylic acids there are included $\alpha,\beta$-ethylenically unsaturated dicarboxylic acids such as maleic, fumaric, citraconic, $\gamma,\gamma$-dimethylcitraconic, mesaconic, itaconic, $\alpha$-methylitaconic, $\gamma$-methylitaconic, teraconic, and the like, as well as mixtures thereof. Furthermore, I may also employ minor amounts of saturated, benzenoid unsaturated, or non-benzenoid unsaturated polycarboxylic acids containing three or more carboxyl groups, such as aconitic acid, tricarballylic acid, and the like, as well as mixtures thereof, together with any of the aforementioned dicarboxylic acids.

The anhydrides of any of the aforementioned polycarboxylic acids, whenever available may be substituted for said acids in whole or in part.

The reactive condensate (A) is prepared by co-reacting from about 1 to about 8 mols, and preferably from about 3 to about 5 mols of polyalkylated polymethylolmelamine per mol of organic polycarboxylic acid. The reaction is carried out at a temperature of from about 100° C. to about 220° C., at atmospheric pressure, either in air or in an inert atmosphere, such as can be obtained by bubbling an inert gas, e.g., carbon dioxide, nitrogen, or the like through the reaction mixture, while distilling off by-products such as lower alkanol split off from the polyalkylated polymethylolmelamine, water, and the like, until a co-reaction product having an acid number not appreciably more than about 10 is obtained. I prefer to employ reactive condensates (A) having acid numbers ranging from about 2 to about 6.

The second essential ingredient of my potentially stain-retardant compositions is a reactive organic polyfunctional polyol. One class of polyfunctional polyols which may be employed in the practice of the present invention encompasses reactive, free hydroxyl-containing polymers obtained by copolymerizing vinyl aromatic monomers such as styrene; side chain-substituted styrenes, such as $\alpha$-methyl styrene; $\alpha$-ethyl styrene; and the like; ring-substituted styrenes, such as alkyl styrenes, e.g., ortho-, meta-, and para-alkyl styrenes such as o-methyl styrene, p-ethyl styrene, m-propyl styrene, and the like, dialkyl styrenes, e.g., 2,4-dimethyl styrene, 2,5-diethyl styrene, and the like, halostyrenes, e.g., o-bromo styrene, p-chloro styrene, 2,4-dichloro styrene, and the like, with a hydroxyl-containing vinyl monomer corresponding to the general formula:

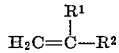

wherein $R^1$ represents a hydrogen atom, a halogen atom, i.e., fluorine, chlorine, bromine or iodine, or an alkyl group having from 1 to 4 carbon atoms, inclusive, and $R_2$ represents a hydroxyalkyl group, preferably a primary hydroxyalkyl group having from 1 to 4 carbon atoms, inclusive, or the radical:

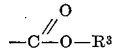

wherein $R^3$ represents a hydroxyalkyl group, preferably a primary hydroxyalkyl group, having from 1 to 4 carbon atoms, inclusive, using conventional vinyl polymerization techniques, e.g., solution or suspension polymerization in the presence of a free radical polymerization catalyst such as benzoyl peroxide, cumene hydroperoxide, and the like.

An illustrative but by no means exhaustive enumeration of hydroxy-containing vinyl monomers coming within the scope of the above general formula includes such compounds as allyl alcohol, $\beta$-bromoallyl alcohol, $\beta$-chloroallyl alcohol, methallyl alcohol, 3-buten-1-ol, 3-buten-2-ol, 4 - penten - 1 - ol, 4-penten-2-ol, 2-hydroxy-ethyl acrylate, 2-hydroxyethyl methacrylate, 2-hydroxy-ethyl-2-ethylacrylate, 2-hydroxyethyl-2-propylacrylate, 2-hydroxyethyl-2-butylacrylate, 2-hydroxyethyl-2-chloroacrylate, 2-hydroxypropyl acrylate, 3-hydroxypropyl methacrylate, 3-hydroxypropyl-2-propylacrylate, 3-hydroxypropyl-2-butylacrylate, 3-hydroxypropyl-2-bromoacrylate, 4-hydroxybutyl acrylate, 4-hydroxybutyl methacrylate, 3-hydroxybutyl-2-ethylacrylate, 3-hydroxybutyl-2-butyl-acrylate, 4-hydroxybutyl-2-butylacrylate, 4-hydroxybutyl-2-chloroacrylate, and the like. These hydroxy-containing vinyl monomers, as well as methods for their preparation, are well known in the art. Thus, for example, one method for the preparation of the above-described hydroxyalkyl acrylates and alkacrylates involves reacting the appropriate acrylic acid derivative, or a suitable ester thereof, with an alkane diol. Another method involves the reaction of the appropriate acrylic acid derivative with a lower alkylene oxide, such as ethylene oxide, propylene oxide, and the like.

A second class of polyfunctional polyols which may be employed in preparing my potentially stain-retardant compositions encompasses epoxy resinous materials, such as those obtained by reacting a polyhydric phenol with an epihalohydrin, such as epichlorohydrin, epibromohydrin, or epiiodohydrin. Among the polyhydric phenols which may be used in preparing these epoxy resinous materials are those compounds represented by the general formula:

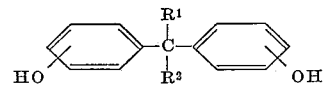

wherein the phenolic hydroxy groups may be in any of the 2,2'; 2,3'; 2,4'; 3,3'; 3,4' or 4,4' positions on the aromatic nuclei, and each of $R^1$ and $R^2$ represent hydrogen a lower alkyl group, such as methyl, ethyl, propyl, isopropyl, butyl, sec-butyl, tert-butyl, pentyl, isopentyl, hexyl, isohexyl, and the like; a cyclo(lower)alkyl group, such as a cyclohexyl or substituted cyclohexyl group, e.g., methyl-, ethyl-, propyl-, butyl-, pentyl- and hexyl-substituted cyclohexyl, or an aromatic group, such as phenyl, tolyl, xylyl, and the like, with the total number of carbon atoms in the substituents represented by $R^1$ and $R^2$ not exceeding 14. In addition, the phenolic rings may have other substituents besides the hydroxyl groups, for example lower alkyl groups containing from 1 to 4 carbon atoms, i.e., methyl, ethyl, propyl, isopropyl, butyl, sec-butyl and tert-butyl groups, or halogen atoms, i.e., fluorine, chlorine, bromine or iodine.

An illustrative but by no means exhaustive listing of polyhydric phenols falling within this general formula includes 4,4'-dihydroxydiphenylmethane, 2,2-bis-4-hydroxyphenylpropane, 2,4' - dihydroxydiphenylethylmethane, 3,3'- dihydroxydiphenyldiethylmethane, 3,4'- dihydroxydiphenylmethylpropylmethane, 2,3'-dihydroxydiphenylethylphenylmethane, 4,4' - dihydroxydiphenylpropylphenylmethane, 4,4'-dihydroxydiphenylbutylphenylmethane, 2,2' - dihydroxydiphenylditolylmethane, 4,4' - dihydroxydiphenyltolylmethylmethane, and the like. Other polyhydric phenols which may also be co-reacted with an epihalohydrin to provide epoxy resinous materials which may be employed in the practice of the present invention are such compounds as resorcinol, hydroquinone, substituted hydroquinones, e.g., p-tert-butylhydroquinone, and the like, and indanols such as those disclosed in U.S. Patent No. 2,754,285 to Petropoulos.

The preparation of epoxy resinous materials of this type is well known in the art and has been described so many times, particularly in the patent literature, that further discussion on this point is deemed unnecessary.

When using any of the above-described reactive organic polyfunctional polyols, minor amounts, e.g., amounts ranging up to about 10% by weight of total polyol employed, of polyalkylene polyols which are condensation products of lower alkylene oxides, such as ethylene oxide, propylene oxide, and the like, with organic triols, tetrols, pentols, hexols, and the like, such as trimethylol ethane, trimethylol propane, pentaerythritol, dipentaerythritol, arabitol, xylitol, dulcitol, adonitol, sorbitol, mannitol, and the like, may also be incorporated to provide additional hardness to the final thermoset compositions.

The potentially stain-retardant compositions of the present invention are prepared by blending together from about 20 to about 75 parts by weight of reactive condensate (A) and, correspondingly, from about 80 to about 25 parts by weight of reactive organic poly-functional polyol. This may be accomplished, for example, by milling a mixture of these two essential ingredients in the absence of a solvent on a two-roll mill at a temperature of from about 80° C. to about 130° C. until a substantially homogeneous blend is obtained, or by merely dissolving either or both of them in a suitable inert organic solvent and then blending them together by any suitable mechanical means, such as in a laboratory mixer, to obtain a substantially homogeneous blend.

For certain applications dry blends, such as those obtained by milling mixtures of the two essential ingredients, will be pulverized to fine, powdery materials, for example by ball milling, and used as such. In other cases, these powdered materials will be dissolved in a suitable organic solvent and used in this form to treat the surfaces of heat- and pressure-consolidated aminoplast articles. Similarly, blends prepared from solutions of the two essential ingredients may be either used as such for certain applications, with or without the further addition of a suitable organic solvent, or the solvent used in preparing the blend may be evaporated and the resulting dry, homogeneous blend may then be pulverized to a fine powder and used in this form as a potentially stain-retardant composition.

As previously indicated, an acid curing catalyst will be incorporated into my novel thermosetting resinous compositions prior to their use, in order to facilitate their cure. A particularly preferred class of acid curing catalysts includes mineral acids, such as phosphoric acid and the like, as well as organic acids such as phthalic, p-toluenesulfonic, benzenesulfonic, and the like. The optimum curing conditions are modified to some extent by the choice of the particular catalyst. Thus, a more active catalyst, e.g., p-toluenesulfonic acid, should be used in lower concentrations, e.g., about 0.5% by weight, based on the weight of the resinous blend, than a less reactive material, e.g., phthalic acid, which will usually be employed to the extent of about 1% by weight, based on the total weight of the resinous blend. In general, however, these acid curing catalysts may be employed in amounts ranging from about 0.2% to about 1.5% by weight, based on the total weight of the resinous blend, which blend may be in either solution or powder form at the time the acid curing catalyst is introduced.

It should also be noted at this point that the procedures outlined above for the preparation of my potentially stain-retardant compositions merely represent preferred methods of preparation, and should not be considered a limitation on my inventive concept, inasmuch as any suitable method of compounding the essential ingredients of my compositions may be employed without detracting from the spirit and scope of the invention.

Similarly, any of a number of suitable methods may be employed in applying my potentially stain-retardant compositions to the surfaces being treated and curing said compositions thereon.

One such method involves the use of solutions of my novel thermosetting resinous compositions in inert organic solvents. Among such solvents there are included aromatic hydrocarbons, such as benzene, toluene, xylene, and the like; aliphatic monocarboxylic acid esters of aliphatic monohydric alcohols, such as butyl acetate, amyl acetate, hexyl acetate, ethyl butyrate, and the like; aliphatic monocarboxylic acid monoesters of the lower alkyl monoethers of dihydric alcohols, such as the monoacetates of the methyl, ethyl, propyl and butyl monoethers of ethylene glycol, diethylene glycol, and the like; aliphatic monocarboxylic acid diesters of dihydric alcohols, such as the diacetates of ethylene glycol, diethylene glycol, and the like; ketones, such as acetone, methyl ethyl ketone, diethyl ketone, methyl isobutyl ketone, cyclohexanone, and the like; and halogenated organic solvents, such as ethylene dichloride, chlorobenzene, and the like. As might be expected, mixtures of these solvents may also be employed and, in some instances, will even be preferred.

The relative amounts of solvent and substantially homogeneous blend which are employed may be varied over a wide range, depending on the viscosity desired in the coating composition, which in turn will depend on the method to be employed in applying the composition to the surfaces to be treated. For instance, if the composition is to be applied using a doctor knife or similar spreading means, relatively viscous solutions or, in some cases, almost paste-like materials, will be prepared. In such a case, relatively small amounts of solvent are needed. If, on the other hand, the composition is to be applied by spraying, by brush- or roller-coating, or by dipping the article therein, larger amounts of solvent will be employed. In general, the amount of solvent employed will be such that the substantially homogeneous blend will be present in solution at a solids content ranging from about 5 to about 95% by weight.

Where solutions of my potentially stain-retardant compositions in inert organic solvents are formulated for use in dip-, flow-, brush- or roller-coating heat- and pressure-consolidated aminoplast articles it may be desirable, in certain instances, to add to such solutions minor amount, e.g., amounts ranging from about 0.1 to about 1 part by weight, based on the total weight of the solution, of conventional levelling agents, such as butylated melamine-formaldehyde resins, butylated urea-formaldehyde resins, silicone oils, and the like, in order to counteract any possible tendency towards cratering or pinholing in the final thermoset coating. Ordinarily, this expedient will not be necessary where solutions of my potentially stain-retardant compositions are applied using conventional spray-coating techniques.

If the substantially homogeneous blends comprising my novel thermosetting resinous compositions are to be used to provide clear stain-resistant coatings, no colorant need be used. However, if it is desired to produce colored coatings a wide variety of pigments, dyes and colorants of all descriptions may be incorporated in conventional amounts into said blends to provide the desired effect.

Following the application of the solution of my potentially stain-retardant compositition to the aminoplast surface being treated, the coated article is first dried to evaporate the inert solvent, e.g., by air drying at room temperature, and then placed in an oven and heat-treated, at temperatures ranging from about 110° C. to about 165° C. for from about 5 to about 30 minutes, to cure the thermosetting coating to a substantially insoluble, infusible, stain-resistant form. The drying time prior to heat-treating may be accelerated if desired, for example by the use of a suitable drying apparatus or by applying the coating composition to the heat- and pressure-consolidated aminoplast article as it comes from the mold or press.

Another method which is particularly adapted to the preparation of aminoplast molded articles coated with my novel thermoset stain-resisting compositions involves a technique which may be termed overglaze molding and which may be best understood by first briefly considering the procedure customarily followed in the conventional methods of preparing heat- and pressure-consolidated molded articles from aminoplast resinous compositions such as thermosetting melamine-formaldehyde resinous compositions.

The thermosetting aminoplast resinous molding materials employed in the usual commercial molding practices are prepared by first impregnating a fibrous filler, such as chopped α-cellulose, with a thermosetting aminoplast resin in syrup form, drying the impregnated material to a low volatile content, usually in the order of about 8% or less, converting the dried material to a fine, fluffy powder while blending it with various commonly employed additives, such as curing catalysts, pigments, mold lubricants, and the like, and finally densifying and granulating the powdered molding composition, thus converting it to a form especially suited for commercial molding techniques.

In such techniques, the common practice is to first shape the granular molding composition into a preformed article which approximates the shape the article will assume in its final form. This pre-forming step may be carried out either in a press or mold specifically designed for pre-forming or in a conventional molding press, either with or without the application of heat, to result in a pre-formed article whose resin content either remains uncured or becomes only partially cured, thus providing for the subsequent application of a decorative overlay, if desired. Decorative overlays comprising a single sheet or foil of high grade α-cellulose paper or similar fibrous material impregnated with a thermosetting aminoplast resin of the type found in the pre-form and imprinted with an ornamental design are usually employed to provide a decorative effect to relatively flat molded pieces, such as dinner plates, saucers, and the like, and are ordinarily not used with dee-draw molded articles such as cups, bowls, and the like. The pre-formed article is of a somewhat porous nature, and should contain slightly more resinous material than will be retained by the article when it assumes its final molded form. This is to insure that the mold used in the final molding operation will be substantially filled, with the usual provision being made for a small amount of flashing.

Ordinarily, the pre-formed article, either with or without a decorative overlay, is then placed in a molding press and molded, under suitable conditions of heat and pressure, to its final molded form. The overglaze molding technique employed in preparing aminoplast molded articles coated with my novel thermoset stain-resisting compositions represents a slight departure from this common practice, in that the pre-formed article is first molded under suitable conditions of heat and pressure until the point is reached at which, for the first time, the degree of cure accomplished is such that the mold can be opened without damaging the article being molded or having it stick to the opening portion of the mold. An article which has reached this degree of cure can be termed a pre-molded article. The time required to reach this point in the curing cycle will depend on many factors, e.g., the design of the mold, the nature of the composition being molded, the temperature and pressures used, etc., and will vary to some extent for each different molding operation encountered, but in general, it will usually be about 30 seconds or more after the start of the molding cycle. At this point, the mold is opened and an amount of my potentially stain-retardant composition, either in powdered form or as a solution in an inert solvent, sufficient to ultimately produce a thermoset coating of a desired thickness on the surfaces being treated is placed on the pre-molded article. Then, the mold is again closed, heat and pressure are applied, and the curing of both the pre-molded article and the potentially stain-retardant composition is carried to substantial completion.

Coatings of my novel stain-resistant compositions may be applied to heat- and pressure-consolidated aminoplast resin articles in a wide range of thicknesses. The thickness of a particular coating applied by any suitable method, including those described hereinabove, can be regulated by many factors, including those inherent in the particular coating process itself, e.g., the viscosity of the treating solution and the time of contact in the case of coatings applied from solutions of my potentially stain-retardant compositions. Stain-resistance can be obtained from coatings of a fraction of a mil in thickness. However, depending on the degree of abrasion resistance required in the coated article, coatings of from about 0.2 to about 1.0 mil or higher will usually be applied.

Thermosetting aminoplast resins of the type employed in the preparation of the heat- and pressure-consolidated articles treated in accordance with the practice of the present invention are synthetic resins prepared by the condensation reaction of an amino (including imino) or amido (including imido) compound with an aldehyde. Resinous condensates of this type, as well as methods for their preparation, have been shown innumerable times in the prior art, and adequate disclosures of them may be found in, for example, U.S. Patents Nos. 2,197,357, 2,310,004 and 2,328,592 to Widmer et al. and 2,260,239 to Talbot. The present invention is concerned particularly with the treatment of molded and laminated articles prepared from aminoplast resins of the type wherein one or more aminotriazines containing at least two amidogen groups, each having at least one aldehyde-reactable hydrogen atom attached to the amidogen nitrogen atom, e.g., melamine, have been reacted with an aldehyde, such as formaldehyde, to yield a potentially thermoset resinous condensate, i.e., one which has been carried to an intermediate stage of condensation whereby it remains as a resinous material soluble or readily dispersible in aqueous systems while also remaining capable of being converted, under suitable conditions of heat and pressure, to a substantially insoluble and infusible form.

Melamine is the preferred aminotriazine reactant for preparing the heat-curable or potentially heat-curable partially polymerized aminotriazine-aldehyde resinous reaction products which are treated according to the practice of the present invention, but other aminotriazines, e.g., mono-, di- and tri-substituted melamines, such as the mono-, di- and tri-methylmelamines, and the like, or guanamines, such as formoguanamine, acetoguanamine, benzoguanamine, and the like, may be utilized as reactants with any suitable aldehyde in preparing the aminotriazine-aldehyde resinous reaction product. Similarly, formaldehyde, preferably in aqueous solution, is the preferred aldehyde reactant, but other aldehydes, e.g., acetaldehyde, propionaldehyde, butyraldehyde, benzaldehyde, and the like, or compounds engendering aldehydes, e.g., paraformaldehyde, hexamethylenetetramine, and the like, may also be employed. The properties desired in the finished product and economic considerations are among the elements which will determine the choice of the particular aminotriazine and aldehyde employed.

The mol ratio of aldehyde to aminotriazine in such resinous reaction products is not critical, and may be within the order of from about 1.5:1 to about 4:1, respectively, depending on the nature of the starting materials and the characteristics desired in the final product, but it is preferred that the mol ratio be within the order of from about 2:1 to about 3:1, respectively.

Conventional reaction conditions are observed in preparing the thermosetting aminotriazine-aldehyde resin, i.e., the aldehyde and aminotriazine may be heat-reacted at temperatures ranging from about 40° C. to reflux temperature, i.e., about 100° C., for periods of time ranging from about 30 to 120 minutes, at a pH ranging from about 6.5 to 10, either by themselves or in an aqueous medium.

I may also employ other amido or imido compounds besides the aminotriazines in preparing the aminoplast resins used in the heat- and pressure-consolidated articles treated in accordance with the present invention. For example, I may employ urea and those of its derivatives which have been commonly used in the preparation of aminoplast resinous compositions, such as for example the alkylureas, e.g., mono- and dimethylurea, halourea, and the like.

The various processes for the preparation of heat- and pressure-consolidated molded and laminated articles from aminoplast resinous compositions are so well known in the art that no further mention need be made of them here, except to say that aminoplast resinous compositions may be used with any conventional material, e.g., α-cellulose paper, cellulosic fabrics, silk, glass cloth, rayon, nylon, or other synthetic fabrics, and the like, in the preparation of laminates and also that aminoplast resinous compositions may have incorporated therewith for molding purposes conventional fillers, such as α-cellulose, cellulosic fibers, glass or other synthetic fibers, asbestos, mica, sand, ground cork, and the like, mold lubricants, such as zinc stearate, glyceryl monostearate, and the like, curing catalysts, such as phthalic anhydride, p-toluenesulfonic acid, benzenesulfonic acid, and the like.

In order that those skilled in the art may more fully understand the inventive concept presented herein, the following examples are set forth. These examples are given solely by way of illustration and should not be considered as expressing limitations unless so set forth in the appended claims. All parts and percentages are by weight, unless otherwise stated.

PREPARATION OF REACTIVE CONDENSATE A–1

4000 parts of hexakismethoxymethylmelamine and 400 parts of phthalic acid were charged to a suitable reaction vessel equipped with thermometer, stirrer, heating mantle and distillation condenser and slowly heated, with stirring, to a temperature of 109° C., at which point all the phthalic acid had dissolved and distillation commenced. Heating was continued to raise the temperature of the reaction mixture to 170° C., and the mixture was held at that temperature until no further distillate could be collected. A total of 298 grams of by-product distillate having a boiling point range of 67–103° C. was collected. Heating was then discontinued, and the resulting reactive condensate, a viscous, light amber liquid having an acid number in methyl ethyl ketone of 2.0, was discharged from the reaction vessel into a suitable container and cooled to room temperature.

PREPARATION OF REACTIVE CONDENSATE A–2

100 parts of hexakismethoxymethylmelamine and 10 parts of phthalic acid were charged to a suitable reaction vessel equipped in the same manner as the vessel used in the preparation of Reactive Condensate A–1 above. The reaction mixture was slowly heated, with stirring, to a temperature of 110° C. to dissolve all the phthalic acid, and the temperature was then increased to 210° C., while collecting distillate, and held at that point until no further distillate appeared. Heating was then discontinued, and the resulting viscous, amber colored reactive condensate, having an acid number in methyl ethyl ketone of 6, was discharged from the reaction vessel into a suitable container and cooled to room temperature.

*Example I*

A solution prepared by dissolving 150 parts of Reactive Condensate A–1 at room temperature in a mixed solvent consisting of 60 parts of toluene and 60 parts of xylene was blended in a laboratory mixer at room temperature with 150 parts of a commercially available epoxy resinous material obtained by condensing bisphenol A (2,2-bis-4-hydroxyphenylpropane) and epichlorohydrin and having a molecular weight of approximately 2625, 180 parts of Cellosolve acetate and 3 parts of a commercially available butylated melamine-formaldehyde leveling agent to give a homogeneous solution having a Gardener-Holdt viscosity of K (measured in a bubble tube at 25° C.). Then, 6 parts of a 25% solution of p-toluene sulfonic acid were added, with stirring to the homogeneous solution.

This catalyzed solution was flow-coated onto the surfaces of a white coffee cup molded from a commercially available α-cellulose-filled melamine-formaldehyde molding composition and the excess solution was allowed to drain off. The coated cup was air dried for 15 minutes at room temperature and then heat-cured in a forced circulation air oven for 15 minutes at 130° C. The resulting clear, colorless, thermoset coating had a pencil hardness of 3H–4H and was highly resistant to coffee-staining, as was shown by subjecting the coated cup and an uncoated white cup, molded from the same melamine-formaldehyde molding composition in the same manner as the coated cup, to an accelerated coffee-staining test.

A strong brew of black coffee was prepared by dissolving 32 grams of a standard brand of commercially available instant coffee in one liter of boiling water. The coffee solution was then cooled to 80° C. and the coated and uncoated cups were immersed therein for a period of 144 hours, with the temperature of the coffee solution being held at 80° C. during that time. At the end of this immersion period, both cups were removed from the coffee solution, washed with soap and water and dried. The coated cup was unstained and showed essentially no change from its original appearance, whereas the uncoated cup had become heavily stained and was dark brown in color.

*Example II*

150 parts of Reactive Condensate A–1 were dissolved at room temperature in a mixed solvent consisting of 60 parts of toluene and 60 parts of xylene. To this solution there were then added 150 parts of a commercially available copolymer of styrene and allyl alcohol having a molecular weight of 1150 and an average of 5.2 hydroxy groups per mol, 180 parts of Cellosolve acetate, and 3 parts of a commercially available butylated melamine-formaldehyde leveling agent and the resulting mixture was blended in a laboratory mixer at room temperature until a homogeneous solution was obtained. Six parts of a 25% solution of p-toluene sulfonic acid were then stirred into the homogeneous solution, and the resulting catalyzed solution was flow coated onto the surfaces of a molded white coffee cup identical to the cups described in Example I. After allowing excess coating solution to drain off, the coated cup was air dried for 15 minutes at room temperature and then heat-cured in a forced air circulation oven for 15 minutes at 130° C. The coated cup was then subjected to the accelerated coffee-staining test described in Example I. After immersion for 144 hours at 80° C. in the coffee solution, the coated cup was unstained and showed essentially no change from its original appearance.

*Example III*

Fifty parts of Reactive Condensate A–2 were milled together with fifty parts of the commercially available bisphenol A-epichlorohydrin condensation product used in Example I on a two-roll mill at 99° C. until a homogeneous blend was obtained. This homogeneous blend was then pulverized in a ball mill to a fine, powdery material, to which there was then added 1% of p-toluene sulfonic acid, based on the weight of the powdered blend.

A solution containing 30%, based on resin solids, of the catalyzed powdered blend was prepared by dissolving a predetermined amount of said blend in a mixed solvent consisting of Cellosolve acetate, toluene and xylene in a weight ratio of 3:1:1, respectively. This solution was then flow coated onto the surfaces of a molded white teacup identical to the cups described in the preceding examples and, after draining off excess solution, the coated cup was first air dried for 15 minutes at room temperature and then heat-cured in a forced air circulation oven for 15 minutes at 130° C. When subjected to the accelerated coffee-staining test described in Example I, the coated cup remained unstained after 144 hours immersion at 80° C. in the coffee solution.

*Example IV*

A mixture of 50 parts of Reactive Condensate A-2 and 50 parts of the commercially available styrene-allyl alcohol copolymer used in Example I was blended on a two-roll mill at 99° C. to form a homogeneous blend which was then pulverized to a fine powder in a ball mill. One percent of p-toluenesulfonic acid, based on the weight of the powdered blend, was then blended into the powdered material.

A portion of the catalyzed powdered blend was then dissolved in a mixed solvent consisting of Cellosolve acetate, toluene and xylene in a weight ratio of 3:1:1, respectively to form a 30% solution, based on resin solids. This solution was then used to flow-coat the surfaces of a molded white teacup identical to the cups described in the preceding examples. After allowing excess solution to drain off, the coated cup was air dried and then heat-cured in the manner described in Example III. Following this heat treatment, the coated cup was subjected to the accelerated coffee-staining test described in Example I. After 144 hours' immersion at 80° C. the coated cup remained unstained by the coffee solution.

*Example V*

The required amount of a commercially available α-cellulose-filled melamine-formaldehyde molding composition was charged to a standard dinnerplate mold. The mold was closed and the charge was molded at 157–177° C. under a pressure of 2000 p.s.i. for one minute. The mold was then opened, a predetermined amount of the uncatalyzed powdered blend prepared in Example III, to which there was then added 1% of phthalic acid, based on the weight of the powdered blend, was charged to the upper surface of the pre-molded plate, and the mold was again closed. Molding was continued at 157–177° C. under a pressure of 2000 p.s.i. for an additional period of one minute. The molded, partially coated plate was then removed from the mold and allowed to cool to room temperature.

The partially coated plate was then subjected to the accelerated coffee-staining test described in Example I. After 144 hours' immersion at 80° C. in the coffee solution, the coated surface of the plate showed essentially no change from its original appearance, while the uncoated surface was stained a dark brown.

*Example VI*

The procedure of Example V was repeated in every detail with the exception that a charge of the uncatalyzed powdered blend prepared as described in Example IV, to which there was then added 1% of phthalic acid, based on the weight of the powdered blend, was substituted for the catalyzed blend used in Example V as the overglaze material. The thus-prepared partially coated plate behaved in the same manner as the plate prepared as described in Example V when subjected to the accelerated coffee-staining test, i.e., its coated surface remained essentially unchanged by the coffee solution after immersion for 144 hours at 80° C., while its uncoated surface was badly stained and dark brown in color.

It will be obvious to those skilled in the art that other changes and variations may be made in carrying out the present invention without departing from the spirit and scope thereof as defined in the appended claims.

I claim:

1. A thermosetting resinous composition capable of being cured, in the presence of an acid catalyst, to a substantially insoluble and infusible stain-resistant form comprising a blend of from about 20 to about 75 parts by weight of (A) a pre-formed acid modified reactive condensate obtained by co-reacting, to an acid number not appreciably more than about 10, from about 1 to about 8 mols of (1) a polyalkylated polymethylolmelamine having from about 4 to about 6 methylol groups, of which from about 3 to about 6 are alkylated with a lower alkyl group, and having not more than about one unalkylated methylol group, per mol of (2) an organic polycarboxylic acid, and correspondingly from about 80 to about 25 parts by weight of (B) a reactive organic polyfunctional polyol selected from the group consisting of an epoxy resinous material, obtained by reacting a polyhydric phenol with an epihalohydrin, and a free hydroxyl-containing copolymer of a styrene with a hydroxyl-containing vinyl monomer corresponding to the general formula:

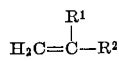

wherein $R^1$ is selected from the group consisting of a hydrogen atom, a halogen atom, and an alkyl group having from 1 to 4 carbon atoms, inclusive, and $R^2$ is selected from the group consisting of hydroxyalkyl groups having from 1 to 4 carbon atoms, inclusive, and radicals represented by the general formula:

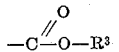

where $R^3$ represents a hydroxyalkyl group having from 1 to 4 carbon atoms, inclusive.

2. A thermosetting resinous composition capable of being cured, in the presence of an acid catalyst, to a substantially insoluble and infusible stain-resistant form comprising a blend of from about 20 to about 75 parts by weight of (A) a pre-formed acid modified reactive condensate obtained by co-reacting, to an acid number not appreciably more than about 10, from about 1 to about 8 mols of (1) a polyalkylated polymethylolmelamine having from about 4 to about 6 methylol groups, of which from about 3 to about 6 are alkylated with a lower alkyl group, and having not more than about one unalkylated methylol group, per mol of (2) an organic polycarboxylic acid, and correspondingly from about 80 to about 25 parts by weight of (B) an epoxy resinous material obtained by reacting a polyhydric phenol with an epihalohydrin.

3. A thermosetting resinous composition capable of being cured, in the presence of an acid catalyst, to a substantially insoluble and infusible stain-resistant form comprising a blend of from about 20 to about 75 parts by weight of (A) a pre-formed acid modified reactive condensate obtained by co-reacting, to an acid number not appreciably more than about 10, from about 1 to about 8 mols of (1) a polyalkylated polymethylolmelamine having from about 4 to about 6 methylol groups, of which from about 3 to about 6 are alkylated with a lower alkyl group, and having not more than about one unalkylated methylol group, per mol of (2) an organic polycarboxylic acid, and correspondingly from about 80 to about 25 parts by weight of (B) a free hydroxyl-containing copolymer of a styrene with a hydroxyl-containing vinyl monomer corresponding to the general formula:

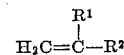

wherein $R^1$ is selected from the group consisting of a hydrogen atom, a halogen atom, and an alkyl group having from 1 to 4 carbon atoms, inclusive, and $R^2$ is selected from the group consisting of hydroxyalkyl groups having from 1 to 4 carbon atoms, inclusive, and radicals represented by the general formula:

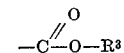

wherein $R^3$ represents a hydroxyalkyl group having from 1 to 4 carbon atoms, inclusive.

4. A thermosetting resinous composition capable of being cured, in the presence of an acid catalyst, to a substantially insoluble and infusible stain-resistant form comprising a blend of from about 20 to about 75 parts by weight of (A) a pre-formed acid modified reactive condensate obtained by co-reacting, to an acid number not appreciably more than about 10, from about 1 to 8 mols of (1) hexakismethoxymethylmelamine per mol of (2) phthalic acid, and correspondingly from about 80 to about 25 parts by weight of (B) an epoxy resinous material obtained by reacting 2,2-bis-4-hydroxyphenylpropane with epichlorohydrin.

5. A thermosetting resinous composition capable of being cured, in the presence of an acid catalyst, to a substantially insoluble and infusible stain-resistant form comprising a blend of from about 20 to about 75 parts by weight of (A) a pre-formed acid modified reactive condensate obtained by co-reacting, to an acid number not appreciably more than about 10, from about 1 to about 8 mols of (1) hexakismethoxymethylmelamine per mol of (2) phthalic acid, and correspondingly from about 80 to about 25 parts by weight of (B) a free hydroxyl-containing copolymer of styrene and allyl alcohol.

6. A heat- and pressure-consolidated article, prepared from a thermosetting aminoplast resinous composition, coated with a substantially insoluble and infusible stain-resistant film comprising the resinous reaction product of from about 20 to about 75 parts by weight of (A) a pre-formed acid modified reactive condensate obtained by co-reacting, to an acid number not appreciably more than about 10, from about 1 to about 8 mols of (1) a polyalkylated polymethylolmelamine having from about 4 to about 6 methylol groups, of which from about 3 to about 6 are alkylated with a lower alkyl group, and having not more than about one unalkylated methylol group, per mol of (2) an organic polycarboxylic acid, and correspondingly from about 80 to about 25 parts by weight of (B) a reactive organic polyfunctional polyol selected from the group consisting of an epoxy resinous material, obtained by reacting a polyhydric phenol with an epihalohydrin, and a free hydroxyl-containing copolymer of a styrene with a hydroxyl-containing vinyl monomer corresponding to the general formula:

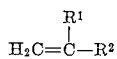

wherein $R^1$ is selected from the group consisting of a hydrogen atom, a halogen atom, and an alkyl group having from 1 to 4 carbon atoms, inclusive, and $R^2$ is selected from the group consisting of hydroxyalkyl groups having from 1 to 4 carbon atoms, inclusive, and radicals represented by the general formula:

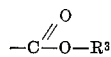

wherein $R^3$ represents a hydroxyalkyl group having from 1 to 4 carbon atoms, inclusive.

7. A heat- and pressure-consolidated article, prepared from a thermosetting melamine-formaldehyde resinous composition, coated with a substantially insoluble and infusible stain-resistant film comprising the resinous reaction product of from about 20 to about 75 parts by weight of (A) a pre-formed acid modified reactive condensate obtained by co-reacting, to an acid number not appreciably more than about 10, from about 1 to about 8 mols of (1) a polyalkylated polymethylolmelamine having from about 4 to about 6 methylol groups, of which from about 3 to about 6 are alkylated with a lower alkyl group, and having not more than about one unalkylated methylol group, per mol of (2) an organic polycarboxylic acid, and correspondingly from about 80 to about 25 parts by weight of (B) an epoxy resinous material obtained by reacting a polyhydric phenol with an epihalohydrin.

8. A heat- and pressure-consolidated article, prepared from a thermosetting melamine-formaldehyde resinous composition, coated with a substantially insoluble and infusible stain-resistant film comprising the resinous reaction product of from about 20 to about 75 parts by weight of (A) a pre-formed acid modified reactive condensate obtained by co-reacting, to an acid number not appreciably more than about 10, from about 1 to about 8 mols of (1) a polyalkylated polymethylolmelamine having from about 4 to about 6 methylol groups, of which from about 3 to about 6 are alkylated with a lower alkyl group, and having not more than about one unalkylated methylol group, per mol of (2) an organic polycarboxylic acid, and correspondingly from about 80 to about 25 parts by weight of (B) a free hydroxyl-containing copolymer of a styrene with a hydroxyl-containing vinyl monomer corresponding to the general formula:

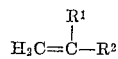

wherein $R^1$ is selected from the group consisting of a hydrogen atom, a halogen atom, and an alkyl group having from 1 to 4 carbon atoms, inclusive, and $R^2$ is selected from the group consisting of hydroxyalkyl groups having from 1 to 4 carbon atoms, inclusive, and radicals represented by the general formula:

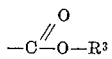

wherein $R^3$ represents a hydroxyalkyl group having from 1 to 4 carbon atoms, inclusive.

9. A heat- and pressure-consolidated article, prepared from a thermosetting melamine-formaldehyde resinous composition, coated with a substantially insoluble and infusible stain-resistant film comprising the resinous reaction product of from about 20 to about 75 parts by weight of (A) a pre-formed acid modified reactive condensate obtained by co-reacting, to an acid number not appreciably more than about 10, from about 1 to about 8 mols of (1) hexakismethoxymethylmelamine per mol of (2) phthalic acid, and correspondingly from about 80 to about 25 parts by weight of (B) an epoxy resinous material obtained by reacting 2,2-bis-4-hydroxyphenylpropane with epichlorohydrin.

10. A heat- and pressure-consolidated article, prepared from a thermosetting melamine-formaldehyde resinous composition, coated with a substantially insoluble and infusible stain-resistant film comprising the resinous reaction product of from about 20 to about 75 parts by weight of (A) a pre-formed acid modified reactive condensate obtained by co-reacting, to an acid number not appreciably more than about 10, from about 1 to about 8 mols of (1) hexakismethoxymethylmelamine per mol of (2) phthalic acid, and correspondingly from about 80 to about 25 parts by weight of (B) a free hydroxyl-containing copolymer of styrene and allyl alcohol.

11. A process for the preparation of a stain-resistant article which comprises applying, to a heat- and pressure-consolidated article prepared from a thermosetting aminoplast resinous composition, a coating of a thermosetting resinous composition comprising a solution, in an inert organic solvent, of a blend of from about 20 to about 75 parts by weight of (A) a preformed acid modified reactive condensate obtained by co-reacting, to an acid number not appreciably more than about 10, from about 1 to about 8 mols of (1) a polyalkylated polymethylolmelamine having from about 4 to about 6 methylol groups, of which from about 3 to about 6 are alkylated with a lower alkyl group, and having not more than about one unalkylated methylol group, per mol of (2) an organic polycarboxylic acid, and correspondingly from about 80 to about 25 parts by weight of (B) a reactive organic polyfunctional polyol selected from the group consisting of an epoxy resinous material, obtained by reacting a polyhydric phenol with an epihalohydrin, and a free hydroxyl-containing copolymer of a styrene with a hydroxyl-containing vinyl monomer corresponding to the general formula:

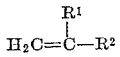

wherein $R^1$ is selected from the group consisting of a hydrogen atom, a halogen atom, and an alkyl group having from 1 to 4 carbon atoms, inclusive, and $R^2$ is selected from the group consisting of hydroxyalkyl groups having from 1 to 4 carbon atoms, inclusive, and radicals represented by the general formula:

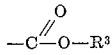

wherein $R^3$ represents a hydroxyalkyl group having from 1 to 4 carbon atoms, inclusive, together with from about 0.2% to about 1.5% by weight, based on the weight of said blend, of (C) an acid curing catalyst, air drying the resulting coated article to evaporate said solvent, and heating the dried, coated article at a temperature of from about 110° C. to about 165° C. for from about 5 minutes to about 30 minutes to cure said coating to a substantially insoluble and infusible stain-resistant form.

12. A process for the preparation of a stain-resistant article which comprises applying, to a heat- and pressure-consolidated article prepared from a thermosetting melamine-formaldehyde resinous composition, a coating of a thermosetting resinous composition comprising a solution, in an inert organic solvent, of a blend of from about 20 to about 75 parts by weight of (A) a pre-formed acid modified reactive condensate obtained by co-reacting, to an acid number not appreciably more than about 10, from about 1 to about 8 mols of (1) a polyalkylated polymethylolmelamine having from about 4 to about 6 methylol groups, of which from about 3 to about 6 are alkylated with a lower alkyl group, and having not more than about one unalkylated methylol group, per mol of (2) an organic polycarboxylic acid, and correspondingly from about 80 to about 25 parts by weight of (B) an epoxy resinous material obtained by reacting a polyhydric phenol with an epihalohydrin, together with from about 0.2% to about 1.5% by weight, based on the weight of said blend, of (C) an acid curing catalyst, air drying the resulting coated article to evaporate said solvent, and heating the dried, coated article at a temperature of from about 110° C. to about 165° C. for from about 5 minutes to about 30 minutes to cure said coating to a substantially insoluble and infusible stain-resistant form.

13. A process for the preparation of a stain-resistant article which comprises applying, to a heat- and pressure-consolidated article prepared from a thermosetting melamine-formaldehyde resinous composition, a coating of a thermosetting resinous composition comprising a solution, in an inert organic solvent, of a blend of from about 20 to about 75 parts by weight of (A) a pre-formed acid modified reactive condensate obtained by co-reacting, to an acid number not appreciably more than about 10, from about 1 to about 8 mols of (1) a polyalkylated polymethylolmelamine having from about 4 to about 6 methylol groups, of which from about 3 to about 6 are alkylated with a lower alkyl group, and having not more than about one unalkylated methylol group, per mole of (2) an organic polycarboxylic acid, and correspondingly from about 80 to about 25 parts by weight of (B) a free hydroxyl-containing copolymer of a styrene with a hydroxyl-containing vinyl monomer corresponding to the general formula:

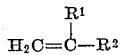

wherein $R^1$ is selected from the group consisting of a hydrogen atom, a halogen atom, and an alkyl group having from 1 to 4 carbon atoms, inclusive, and $R^2$ is selected from the group consisting of hydroxyalkyl groups having from 1 to 4 carbon atoms, inclusive, and radicals represented by the general formula:

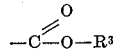

wherein $R^3$ represents a hydroxyalkyl group having from 1 to 4 carbon atoms, inclusive, together with from about 0.2% to about 1.5% by weight, based on the weight of said blend, of (C) an acid curing catalyst, air drying the resulting coated article to evaporate said solvent, and heating the dried, coated article at a temperature of from about 110° C. to about 165° C. for from about 5 minutes to about 30 minutes to cure said coating to a substantially insoluble and infusible stain-resistant form.

14. A process for the preparation of a stain-resistant article which comprises applying, to a heat- and pressure-consolidated article prepared from a thermosetting melamine-formaldehyde resinous composition, a coating of a thermosetting resinous composition comprising a solution, in an inert organic solvent, of a blend of from about 20 to about 75 parts by weight of (A) a pre-formed acid modified reactive condensate obtained by co-reacting, to an acid number not appreciably more than about 10, from about 1 to about 8 mols of (1) hexakismethoxymethylmelamine per mol of (2) phthalic acid, and correspondingly from about 80 to about 25 parts by weight of (B) an epoxy resinous material obtained by reacting 2,2-bis-4-hydroxyphenylpropane with epichlorohydrin, together with from about 0.2% to about 1.5% by weight, based on the weight of said blend, of (C) an acid curing catalyst, air drying the resulting coated article to evaporate said solvent, and heating the dried, coated article at a temperature of from about 110° C. to about 165° C. for from about 5 minutes to about 30 minutes to cure said coating to a substantially insoluble and infusible stain-resistant form.

15. A process for the preparation of a stain-resistant article which comprises applying, to a heat- and pressure-consolidated article prepared from a thermosetting melamine-formaldehyde resinous composition, a coating of a thermosetting resinous composition comprising a solution, in an inert organic solvent, of a blend of from about 20 to about 75 parts by weight of (A) a pre-formed acid modified reactive condensate obtained by co-reacting, to an acid number not appreciably more than about 10, from about 1 to about 8 mols of (1) hexakismethoxymethylmelamine per mol of (2) phthalic acid, and correspondingly from about 80 to about 25 parts by weight of (B) a free hydroxyl-containing copolymer of styrene and allyl alcohol, together with from about 0.2% to about 1.5% by weight, based on the weight of said blend, of (C) an acid curing catalyst, air drying the resulting coated article to evaporate said solvent, and heating the dried, coated article at a temperature of from about 110° C. to about 165° C. for from about 5 minutes to about 30 minutes to cure said coating to a substantially insoluble and infusible stain-resistant form.

References Cited by the Examiner

UNITED STATES PATENTS

| | | | |
|---|---|---|---|
| 2,322,566 | 6/43 | D'Alelio | 260—67.6 |
| 2,398,569 | 4/46 | Widmer | 260—67.6 |
| 2,532,865 | 12/50 | Toland et al. | 260—856 |
| 2,850,475 | 9/58 | Greenlee | 260—834 |
| 2,986,541 | 5/61 | Zuppinger et al. | 260—67.6 |

OTHER REFERENCES

Lee and Neville, Epoxy Resins, McGraw-Hill, N.Y., 1957 (pp. 157–158 relied upon).

MURRAY TILLMAN, *Primary Examiner.*
LEON J. BERCOVITZ, *Examiner.*